United States Patent
Chuang (10) Patent No.: US 9,683,398 B2
(45) Date of Patent: Jun. 20, 2017

(54) MULTIPLE-STAGE POSITIONING STRUCTURE OF SYNCHRONOUSLY ROTATABLE DUAL SHAFTS

(71) Applicant: Deda Metals Company Limited, New Taipei (TW)

(72) Inventor: Kun-You Chuang, New Taipei (TW)

(73) Assignee: DEDA METALS COMPANY LIMITED, New Taipei (TW)

( * ) Notice: Subject to any disclaimer, the term of this patent is extended or adjusted under 35 U.S.C. 154(b) by 282 days.

(21) Appl. No.: 14/547,154

(22) Filed: Nov. 19, 2014

(65) Prior Publication Data

US 2016/0138310 A1    May 19, 2016

(51) Int. Cl.
| | |
|---|---|
| *E05D 3/06* | (2006.01) |
| *E05D 11/10* | (2006.01) |
| *G06F 1/16* | (2006.01) |
| *E05D 3/12* | (2006.01) |

(52) U.S. Cl.
CPC ........ *E05D 11/1078* (2013.01); *G06F 1/1613* (2013.01); *E05D 3/12* (2013.01); *E05Y 2900/606* (2013.01)

(58) Field of Classification Search
CPC ..... E05D 11/1078; E05D 3/12; Y10T 16/547; Y10T 16/5478; Y10T 16/54; Y10T 16/53992; Y10T 16/53838; Y10T 16/54038; E05Y 2900/606; G06F 1/1618; G06F 1/1681; G06F 1/1613
See application file for complete search history.

(56) References Cited

U.S. PATENT DOCUMENTS

| | | | | |
|---|---|---|---|---|
| 3,600,743 | A * | 8/1971 | Meadows | E05D 11/105 16/278 |
| 6,230,365 | B1 * | 5/2001 | Lu | G06F 1/1616 16/16 |
| 6,470,532 | B2 * | 10/2002 | Rude | G06F 1/1616 16/313 |
| 6,983,514 | B2 * | 1/2006 | Lu | G06F 1/1616 16/303 |
| 7,377,012 | B2 * | 5/2008 | Lu | G06F 1/1616 16/342 |
| 7,506,407 | B2 * | 3/2009 | Ishiwata | E05D 11/082 16/340 |

(Continued)

*Primary Examiner* — Victor Batson
*Assistant Examiner* — Matthew Sullivan
(74) *Attorney, Agent, or Firm* — Leong C. Lei (57) ABSTRACT

A multiple-stage positioning structure of dual shafts includes a dual shaft assembly, which includes first and second rotary shafts that are connected to each other with coupling members for being rotated synchronously. The first rotary shaft has a curved section and a planar section. Positioning sleeves are fit over the first and the second rotary shafts. Bearing members bear a positioning bar in such a way to have the planar section of the first rotary shaft in contact engagement with a lateral planar section of the positioning bar. When the first rotary shaft is rotated to have the curved section engage the lateral planar section of the positioning bar, an effect of outward expanding and stretching the positioning sleeves is induced. When the first rotary shaft is rotated to have the planar section re-engage the lateral planar section of the positioning bar, an effect of positioning is induced.

7 Claims, 12 Drawing Sheets

(56) References Cited

U.S. PATENT DOCUMENTS

| | | | | | |
|---|---|---|---|---|---|
| 7,667,959 | B2* | 2/2010 | Pelkonen | G06F 1/1616 248/923 |
| 7,836,552 | B2* | 11/2010 | Chao | G06F 1/1616 16/254 |
| 8,402,608 | B2* | 3/2013 | Lee | G06F 1/1681 16/319 |
| 8,914,946 | B2* | 12/2014 | Hsu | F16H 21/44 16/342 |
| 8,959,715 | B2* | 2/2015 | Hsu | E05D 3/06 16/227 |
| 8,959,719 | B2* | 2/2015 | Hsu | G06F 1/1618 16/303 |
| 8,978,209 | B1* | 3/2015 | Lin | G06F 1/1618 16/303 |
| 9,003,606 | B2* | 4/2015 | Hsu | G06F 1/1681 16/366 |
| 9,057,215 | B1* | 6/2015 | Horng | E05D 3/12 |
| 9,103,147 | B1* | 8/2015 | Chuang | G06F 1/1681 |
| 9,104,381 | B2* | 8/2015 | Kuramochi | G06F 1/1681 |
| 9,134,767 | B2* | 9/2015 | Chen | G06F 1/1681 |
| 9,201,464 | B2* | 12/2015 | Uchiyama | G06F 1/1681 |
| 9,265,167 | B2* | 2/2016 | Hsu | H05K 5/0226 |
| 9,274,566 | B1* | 3/2016 | Horng | G06F 1/1681 |
| 9,290,976 | B1* | 3/2016 | Horng | E05D 3/12 |
| 9,388,614 | B2* | 7/2016 | Hsu | E05D 3/12 |
| 9,439,311 | B2* | 9/2016 | Hsu | E05D 3/122 |
| 2011/0265288 | A1* | 11/2011 | Chiang | G06F 1/1681 16/341 |
| 2011/0314635 | A1* | 12/2011 | Chen | E05D 11/1014 16/277 |
| 2014/0168928 | A1* | 6/2014 | Lee | H01R 35/02 361/809 |
| 2015/0160695 | A1* | 6/2015 | Su | E05D 3/12 16/366 |
| 2015/0245510 | A1* | 8/2015 | Hsu | H05K 5/0226 16/250 |
| 2015/0327383 | A1* | 11/2015 | Hsu | H05K 5/0226 16/366 |
| 2016/0274625 | A1* | 9/2016 | Horng | G06F 1/1681 |

* cited by examiner

MULTIPLE-STAGE POSITIONING STRUCTURE OF SYNCHRONOUSLY ROTATABLE DUAL SHAFTS

BACKGROUND OF THE INVENTION (a) Technical Field of the Invention

The present invention generally relates to a hinge, and more particularly to a multiple-stage positioning structure of synchronously rotatable dual shafts.

(b) Description of the Prior Art

With the progress and advance of science and technology, liquid crystal displays (LCDs) are now widely used as display devices of various electronic products.

LCDs have various advantages, such as high image quality, reduced size, light weight, low driving voltage, low power consumption, and wide applications, and are thus widely used in consumer electronic or computer devices, such as portable televisions, mobile phones, notebook computers, desktop display devices, and projection televisions, making them the main stream of display devices. Taking the notebook computers as an example, a liquid crystal display is mounted to a top cover so that when the notebook computer is being used, the top cover is lifted open to expose the liquid crystal display mounted thereto. The top cover and a computer host are coupled through hinges in order to allow the top cover to be closed and opened with respect to the computer host.

Thus, the hinges are one of the major factors that affect the product quality of the above-mentioned electronic products or computer products. To allow a display casing and a keyboard casing to be rotatable to an angular position desired by a user, the manufacturers have developed and proposed a dual-shaft hinge. However, the known dual-shaft hinges still have drawbacks in respect of structure and functionality.

In view of these problems, the present applicant has filed patent applications regarding multiple-angle synchronously rotatable dual shafts and a series of hinge related patents that help overcome the drawbacks of the conventional hinges have been granted. These hinges are rotatable under a predetermined tensioned condition to allow a user to rotate and turn to an angle that is desired by the user. However, if it is possible, during the rotation of the hinge, to set the hinge at a predetermined position, meaning to provide a positioning effect at the time when the top cover of a notebook computer is closed or opened to a predetermined location (such as the top cover being opened to a midway position), and to allow the hand of the use may sense such a positioning effect, then the use of the hinge can be further improved.

SUMMARY OF THE INVENTION

An object of the present invention is to provide a multiple-stage positioning structure of synchronously rotatable dual shafts, which achieves a positioning effect by means of a curved section and a planar section of a first rotary shaft respectively engageable with a lateral planar section of a positioning bar.

To achieve above object, the present invention comprises a dual shaft assembly, two positioning sleeves, two bearing members, and a positioning bar, wherein the dual shaft assembly comprises a first rotary shaft and a second rotary shaft and at least two coupling members. The first rotary shaft comprises a deformable material and has at least two first mounting slots. The first rotary shaft comprises at least one curved section and at least one planar section. The second rotary shaft has at least two second mounting slots. The coupling members each have two end respectively and movably connected to the first mounting slots and the second mounting slots. The positioning sleeves each comprise a deformable material and are fit over the first rotary shaft and the second rotary shaft. The bearing members are connected to the first rotary shaft and the second rotary shaft. The positioning bar has two ends respectively connected to the bearing members and is arranged between the first rotary shaft and the second rotary shaft. The positioning bar has one side forming a lateral planar section. The lateral planar section is in contact engagement with the planar section of the first rotary shaft.

When the first rotary shaft is rotated to have the curved section engage the lateral planar section of the positioning bar, an effect of outward expanding and stretching the positioning sleeves is induced. When the first rotary shaft is rotated to have the planar section re-engage the lateral planar section of the positioning bar, an effect of positioning (which positioning is detectable by tactile sense of a hand) is achieved. With multiple planar sections provided on the first rotary shaft, multiple stages of positioning can be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
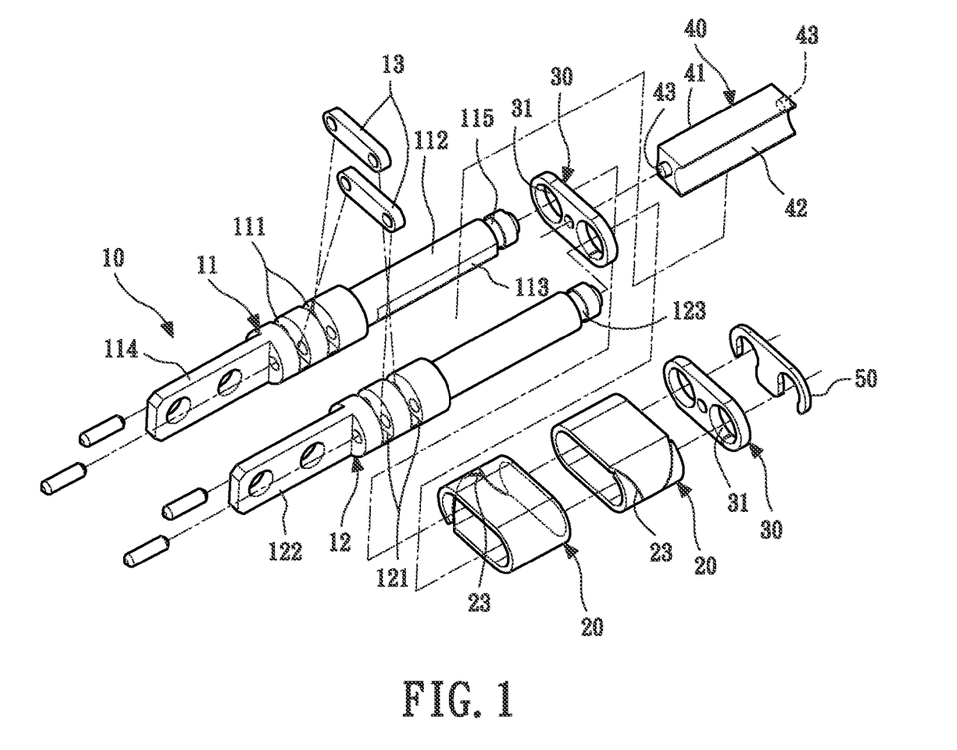
FIG. 1 is an exploded view showing the present invention.
Figure 3:
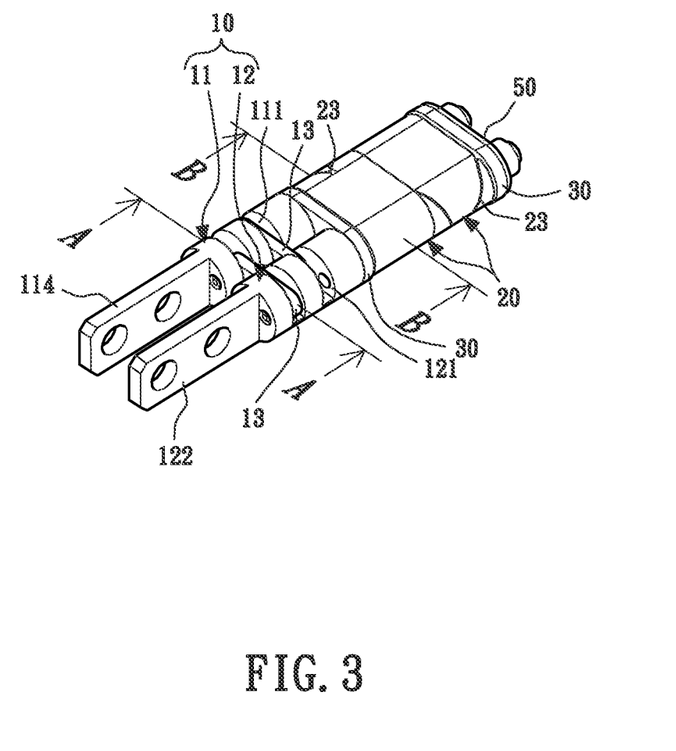
FIG. 3 is a perspective view of the present invention.
Figure 4:
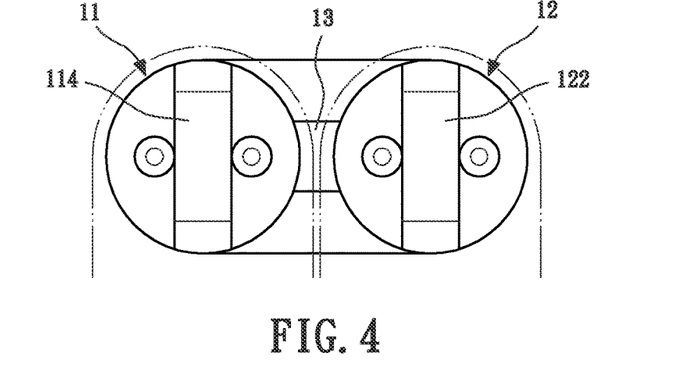
FIGS. 4, 5, and 6 are schematic views illustrating a first rotary shaft and a second rotary shaft of the present invention subjected to synchronous rotation.
Figure 5:
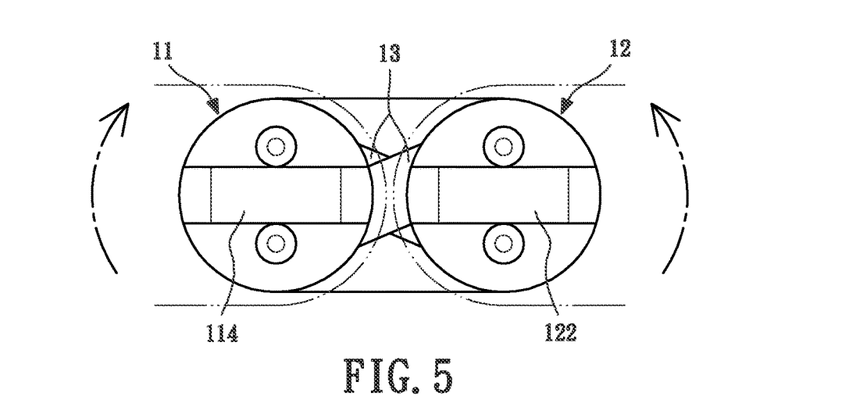
Figure 6:
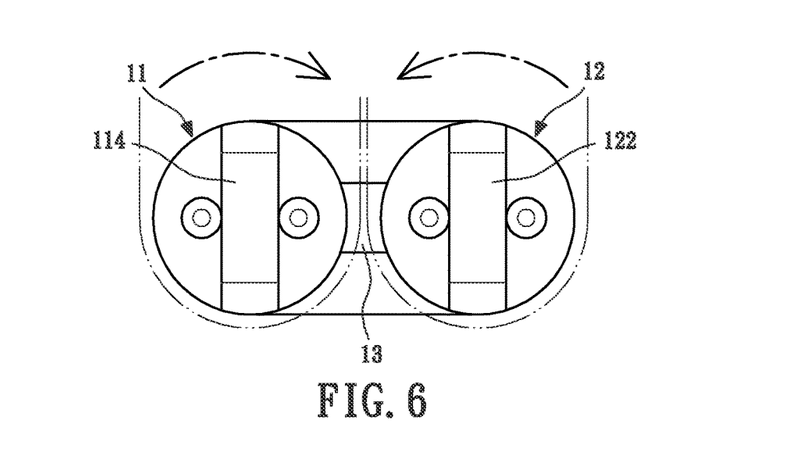
Figure 7:
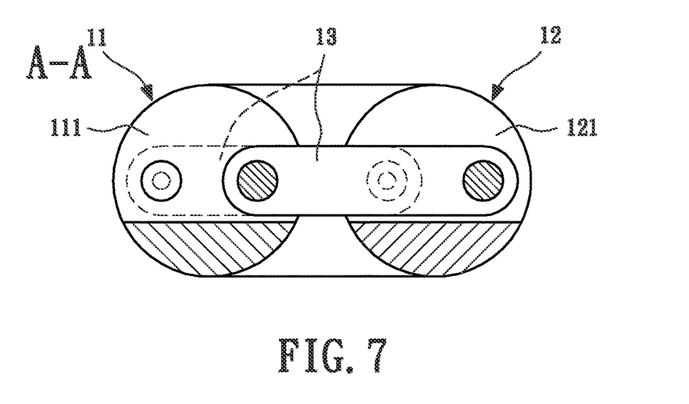
FIGS. 7, 8, and 9 are schematic views, taken along section A-A, illustrating the synchronous rotation of the first and second rotary shafts of the present invention.
Figure 8:
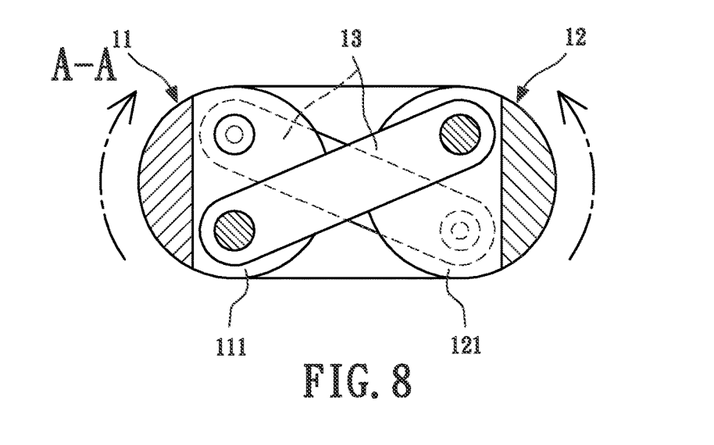
Figure 9:
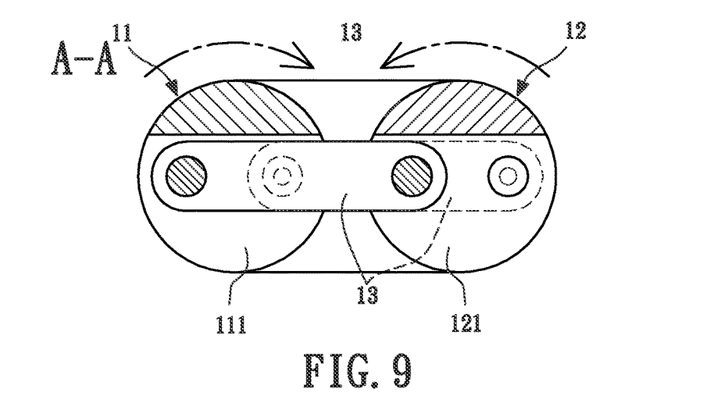
Figure 10:
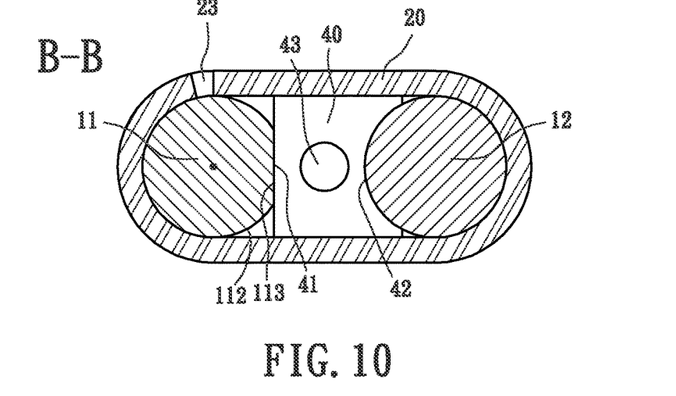
FIGS. 10, 11, 12, and 13 are schematic views, taken along section B-B, illustrating a positioning operation induced between the first rotary shaft and a positioning bar.

Referring to FIGS. 1, 3, and 10, the present invention comprises a dual shaft assembly 10, two positioning sleeves 20, two bearing members 30, and a positioning bar 40. Details will be described as follows:

The dual shaft assembly 10 comprises a first rotary shaft 11, a second rotary shaft 12, and two coupling members 13. The first rotary shaft 11 comprises a deformable material that, when subjected to a force, undergoes deformation. The first rotary shaft 11 comprises two first mounting slots 111. The first rotary shaft 11 comprises a curved section 112 and a planar section 113. The second rotary shaft 12 comprises two second mounting slots 121. The coupling members 13 each have two ends respectively and movably mounted in the first mounting slots 111 and the second mounting slots 121.

The positioning sleeves 20 comprises a deformable material, which, when acted upon by a force, undergoes deformation. The positioning sleeves 20 are fit over the first rotary shaft 11 and the second rotary shaft 12 in such a way that a hollow space is formed to receive the positioning bar 40.

The bearing members 30 are connected to the first rotary shaft 11 and the second rotary shaft 12. In the instant embodiment, the bearing members 30 are respectively set at one side of each of the positioning sleeves 20.

The positioning bar 40 has two ends respectively connected to the bearing members 30 and is arranged between the first rotary shaft 11 and the second rotary shaft 12. The positioning bar 40 has one side that forms a lateral planar section 41. The lateral planar section 41 is set in contact engagement with the planar section 113 of the first rotary shaft 11.

In one embodiment, the first rotary shaft 11 comprises a first fixing section 114. The first fixing section 114 is provided for coupling with a component of a subject to be assembled, such as a top cover of a notebook computer. The second rotary shaft 12 comprises a second fixing section 122. The second fixing section 122 is provided for coupling with another component of the subject to be assembled, such as a host of the notebook computer.

In one embodiment, the bearing members 30 each comprise two through holes 31 formed therein. The through holes 31 function to receive the first rotary shaft 11 and the second rotary shaft 12 to extend therethrough and couple therewith.

In one embodiment, the positioning bar 40 has one side forming a lateral curved section 42. The lateral curved section 42 is engageable with a surface of the second rotary shaft 12. The positioning bar 40 has two ends on which two projecting pegs 43 are respectively formed. The projecting pegs 43 are respectively fit into and coupled with the bearing members 30.

In one embodiment, the first rotary shaft 11 comprises a first groove 115 and the second rotary shaft 12 comprises a second groove 123. The first groove 115 and the second groove 123 receive a support brace 50 fit and disposed therein. The support brace 50 supports and connects the first rotary shaft 11 and the second rotary shaft 12 and retain the bearing members 30 and the positioning sleeves 20 in position to prevent them from getting loosened and detached.

Figure 2:
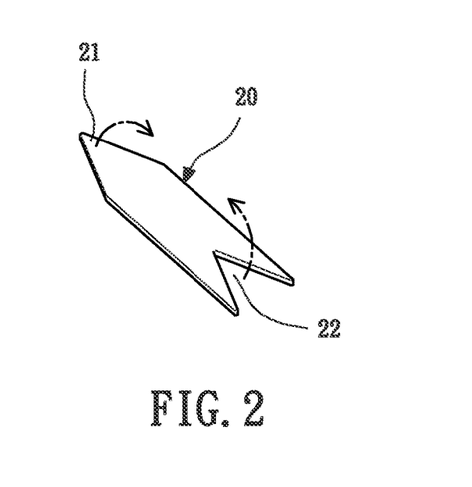
FIG. 2 is a developed view of a positioning sleeve of the present invention.

Referring to FIG. 2, in one embodiment, before being properly shaped, the positioning sleeves 20 each comprise a triangular projection 21 formed at one end thereof and a triangular notch 22 formed in an opposite end, whereby when the positioning sleeves 20 is bent and looped, the triangular projection 21 is received and set in the triangular notch 22 in such a way that a gap 23 is formed therebetween. The gap 23 allows the positioning sleeve 20 to deform in a predetermined manner when it is stretched or pulled outward.

The components that constitute the present invention has been introduced and described above. In the following, the principle and characteristics of the operation of the present invention will be described:

Referring to FIGS. 4, 5, 6, 7, 8, and 9, the present invention comprises coupling members 13 that are coupled between the first rotary shaft 11 and the second rotary shaft 12 so that when one of the first rotary shaft 11 and the second rotary shaft 12 is rotated, a force of mutual push or pull is induced between the first rotary shaft 11 and the second rotary shaft 12. As such, the first rotary shaft 11 and the second rotary shaft 20 are allowed to mutually push or pull each other with less effort so that synchronous rotations can be easily achieved.

Figure 11:
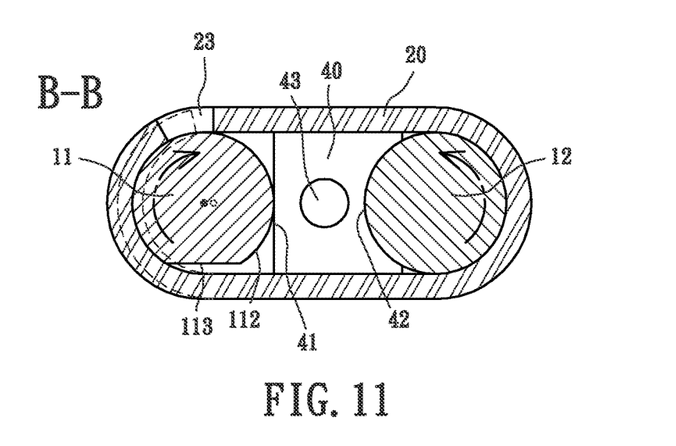
Figure 12:
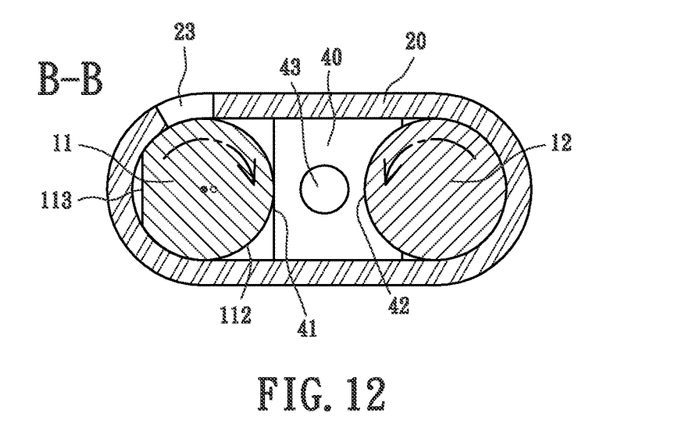

Referring to FIGS. 10, 11, and 12, when the first rotary shaft 11 is rotated to have the curved section 112 engage and contact the lateral planar section 41 of the positioning bar 40, since the first rotary shaft 11 is shifted by a predetermined distance, an effect of outward expanding and stretching the positioning sleeves 20 is induced. In other words, the first rotary shaft 11 and the second rotary shaft 12 can be rotated under predetermined tightness and the user is allowed to make the rotation of the shafts to a desired angular position.

Figure 13:
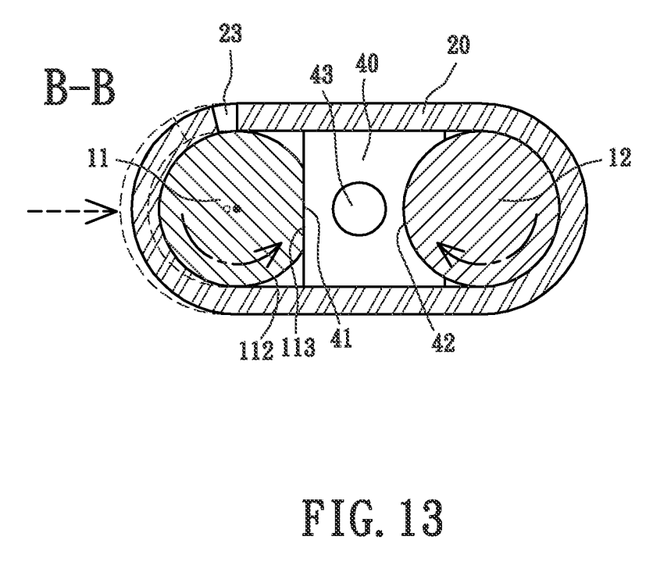
Figure 14:
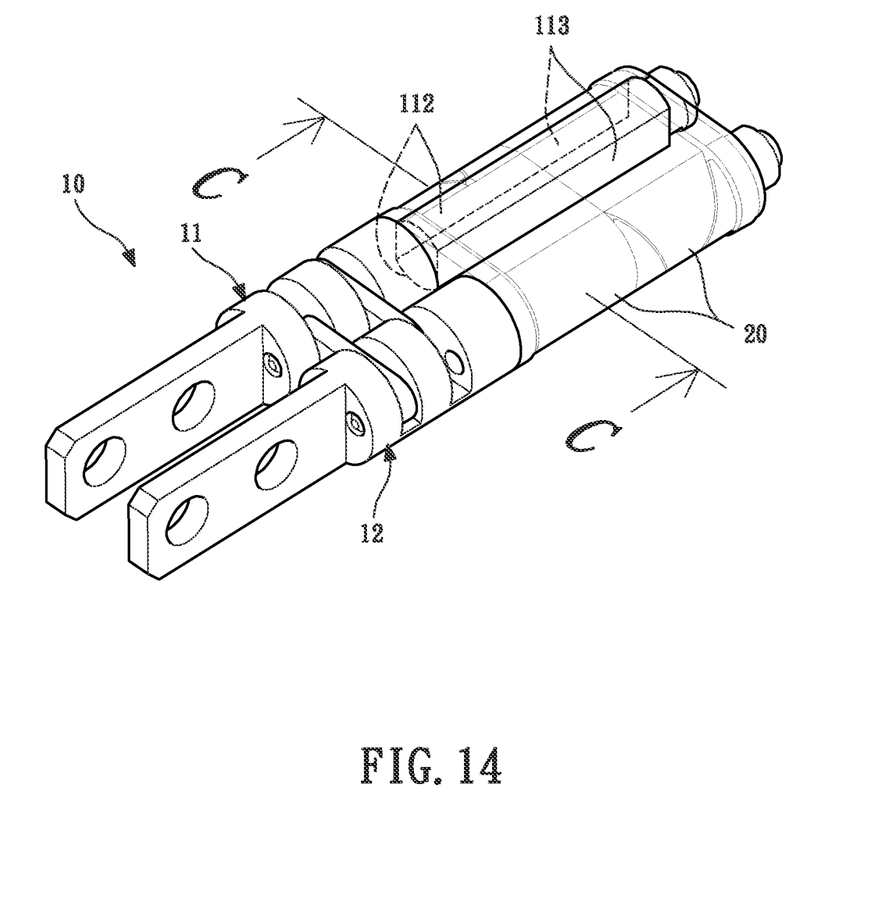
FIG. 14 is a perspective view showing a second embodiment of the present invention.
Figure 15:
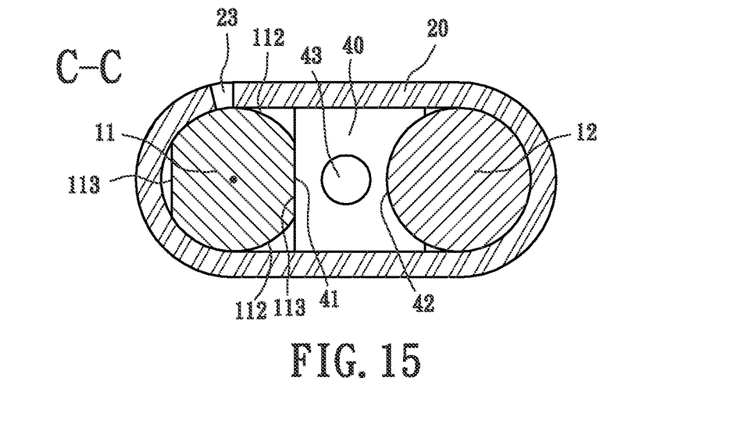
FIGS. 15, 16, and 17 are schematic views, taken along section C-C of the second embodiment of the present invention, illustrating a positioning operation induced between the first rotary shaft and the positioning bar.
Figure 16:
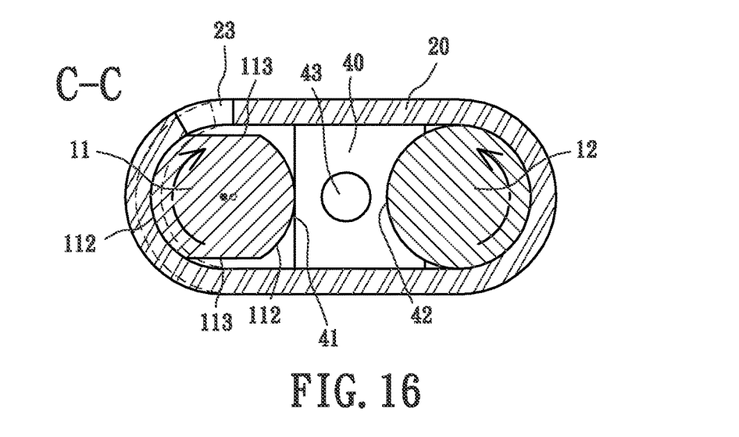
Figure 17:
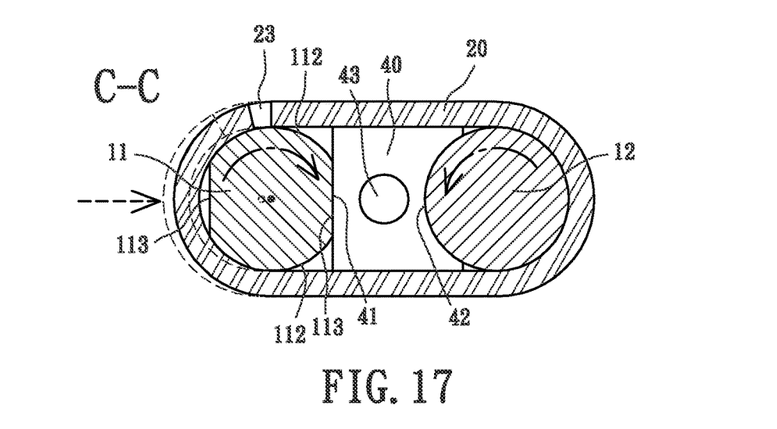

Referring to FIG. 13, when the first rotary shaft 11 is rotated in an opposite direction to have the planar section 113 engage and contact the lateral planar section 41 of the positioning bar 40, the first rotary shaft 11 and the positioning sleeves 20 return to the condition of not outwardly expanding and stretching the positioning sleeves 20 and a positioning effect is induced between the planar section 113 and the lateral planar section 41. When the first rotary shaft 11 is made in a manner of forming multiple planar sections 113, positioning at multiple stages can be realized. In other words, an effect of positioning can be achieved at the time when the notebook computer is closed or opened to a predetermined position (such as the top cover being opened midways) and the hand of the user can sense the effect of positioning.

Based on the above-described structure and functionality, the present invention is applicable to a foldable electronic product that includes a hinge, such as a notebook computer, a portable television, a mobile phone, and a display device, or is installable a door built in a wall.

Referring to FIGS. 14, 15, 16, and 17, in one embodiment, the first rotary shaft 11 may comprise two curved sections 112 and two planar sections 113 and the operation is similar to what described above to achieve an effect of multiple-stage positioning. Repeated description will be omitted here.

Figure 18:
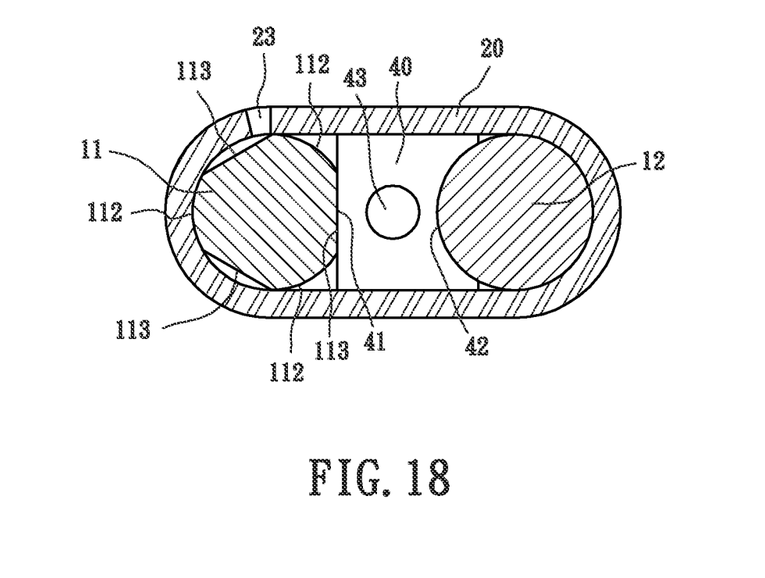
FIGS. 18, 19, and 20 are cross-sectional views of a third embodiment of the present invention, illustrating a positioning effect induced between the first rotary shaft and the positioning bar.
Figure 19:
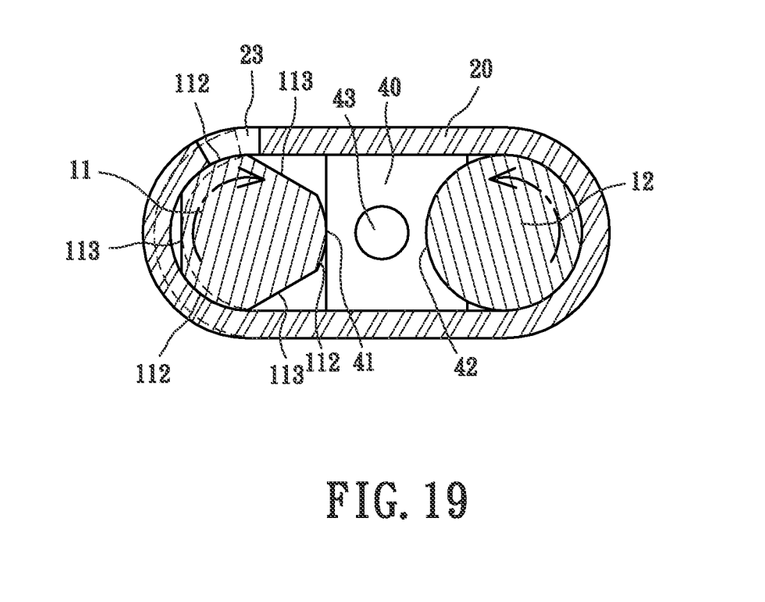
Figure 20:
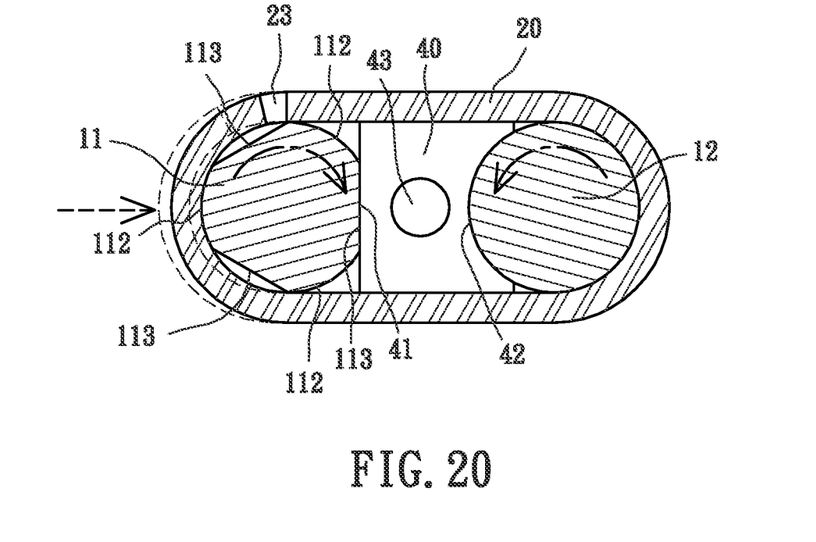

Referring to FIGS. 18, 19, and 20, in one embodiment, the first rotary shaft 11 may comprises three curved sections 112 and three planar sections 113 and the operation is similar to what described above to achieve an effect of multiple-stage positioning. Repeated description will be omitted here.

Figure 21:
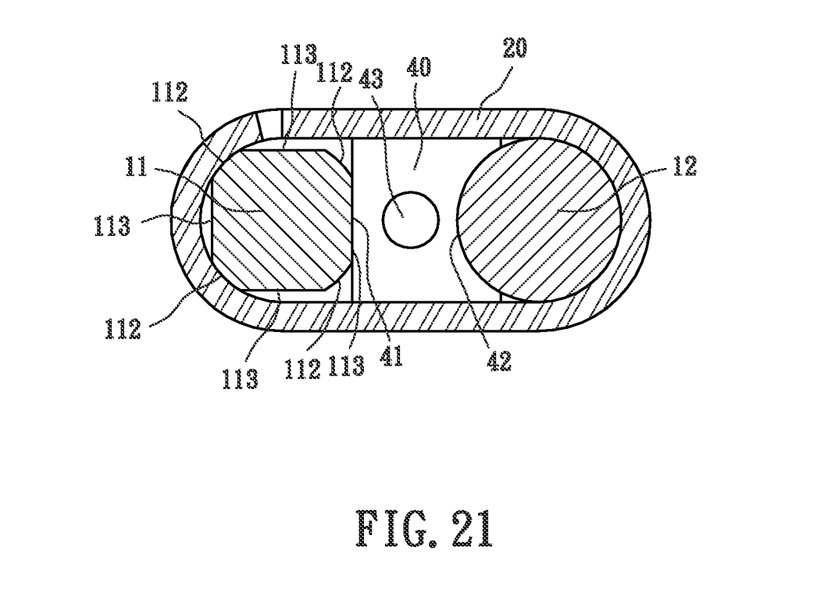
FIG. 21 is a cross-sectional view showing a fourth embodiment of the present invention.

Referring to FIG. 21, in one embodiment, the first rotary shaft 11 comprises four curved sections 112 and four planar sections 113 and the operation is similar to what described above to achieve an effect of multiple-stage positioning. Repeated description will be omitted here.

Figure 22:
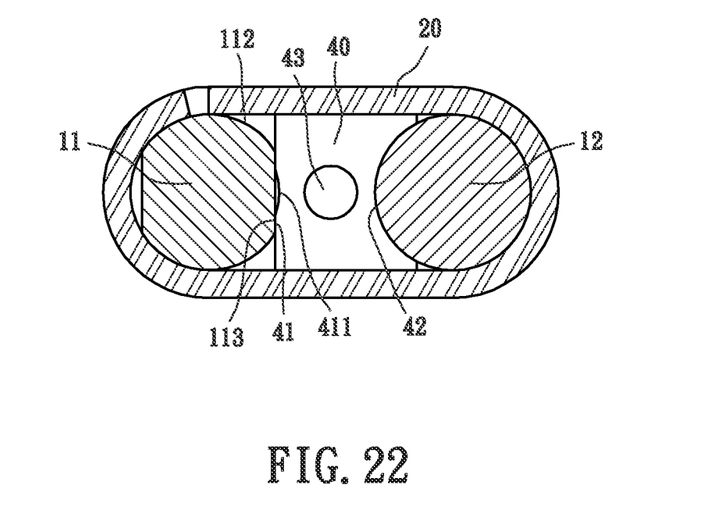
FIGS. 22 and 23 are cross-sectional views of a fifth embodiment of the present invention illustrating a positioning effect induced between the first rotary shaft and the positioning bar.
Figure 23:
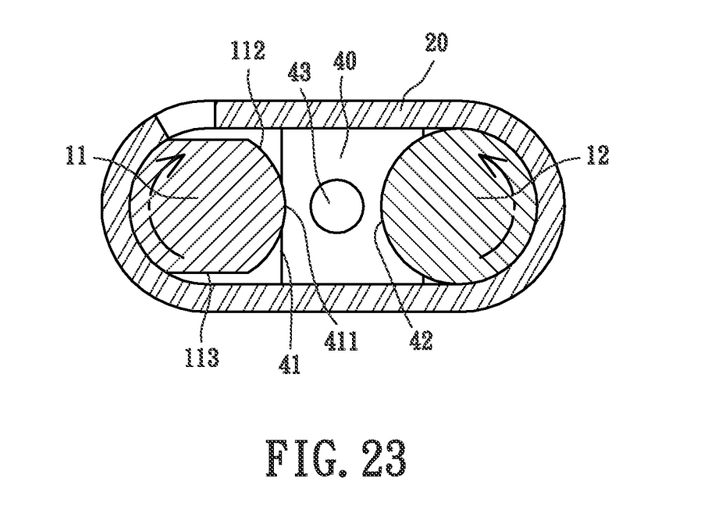

Referring to FIGS. 22 and 23, in one embodiment, the lateral planar section 41 that is formed on one side of the positioning bar 40 comprises a recess 411 formed therein. The recess 411 is shaped to mate with the curved section 112 of the first rotary shaft 11 so that when the first rotary shaft 11 is rotated, the curved section 112 may engage the recess 411 so as to improve stability of the rotation of the first rotary shaft 11 and allows for easy rotation of the first rotary shaft 11 through application of small effort.

Figure 24:
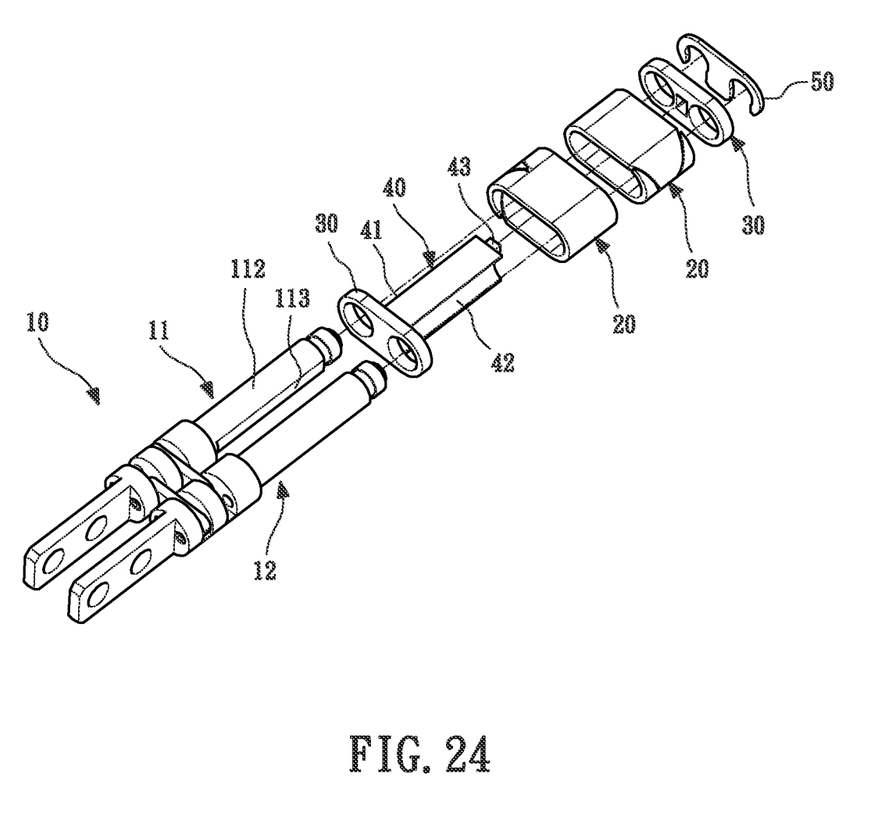
FIG. 24 is an exploded view of a sixth embodiment of the present invention.

Referring to FIG. 24, in one embodiment, one bearing member 30 can be formed integrally with the positioning bar 40.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A multiple-stage positioning structure of synchronously rotatable dual shafts, comprising:
    a dual shaft assembly, which comprises a first rotary shaft and a second rotary shaft and at least two coupling members, the first rotary shaft comprising a deformable material and comprising at least two first mounting slots, the first rotary shaft comprising at least one curved section and at least one planar section, the second rotary shaft comprising at least two second mounting slots, the coupling members each having two ends respectively and movably coupled to the first mounting slots and the second mounting slots;
    at least one positioning sleeve, which comprises a deformable material and is fit over the first rotary shaft and the second rotary shaft;
    at least one bearing member, which is connected between the first rotary shaft, the second rotary shaft; and
    a positioning bar connected to the bearing member and is arranged between the first rotary shaft and the second rotary shaft, the positioning bar having one side that forms a lateral planar section, the lateral planar section being in contact engagement with the planar section of the first rotary shaft;
    wherein the first rotary shaft comprises a first fixing section, the first fixing section being adapted to be coupled to a component of a subject to be assembled and the second rotary shaft comprises a second fixing section, the second fixing section being adapted to be coupled to another component of the subject to be assembled, and the lateral planar section that is formed on one side of the positioning bar comprises a recess formed therein, the recess being shaped to mate with the curved section of the first rotary shaft so that when the first rotary shaft is rotated, the curved section is engageable with the recess.

2. The multiple-stage positioning structure of synchronously rotatable dual shafts according to claim 1, wherein the bearing member comprises two through holes formed therein, the through holes receiving the first rotary shaft and the second rotary shaft to extend therethrough and coupled therewith.

3. The multiple-stage positioning structure of synchronously rotatable dual shafts according to claim 1, wherein the positioning bar has one side forming a lateral curved section, the lateral curved section being engageable with a surface of the second rotary shaft.

4. The multiple-stage positioning structure of synchronously rotatable dual shafts according to claim 1, wherein the positioning bar has two ends on which two projecting pegs are respectively formed, the projecting pegs being respectively fit into and coupled with the bearing members.

5. The multiple-stage positioning structure of synchronously rotatable dual shafts according to claim 1, wherein the first rotary shaft comprises a first groove and the second rotary shaft comprises a second groove, the first groove and the second groove receiving a support brace fit and disposed therein, the support brace supporting and connecting the first rotary shaft and the second rotary shaft.

6. The multiple-stage positioning structure of synchronously rotatable dual shafts according to claim 1, wherein the positioning sleeve, before being shaped, comprises a triangular projection formed at one end thereof and a triangular notch formed in an opposite end thereof, whereby when the positioning sleeve is bent and looped, a gap is formed therebetween.

7. The multiple-stage positioning structure of synchronously rotatable dual shafts according to claim 1, wherein the bearing member is formed integrally with the positioning bar.

\* \* \* \* \*